US006776199B2

(12) United States Patent
Crivellaro et al.

(10) Patent No.: US 6,776,199 B2
(45) Date of Patent: Aug. 17, 2004

(54) CONTAINER FILLING MACHINE

(75) Inventors: Claudio Crivellaro, Verona (IT); Stefano Cavallari, Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 0 days.

(21) Appl. No.: 10/468,692

(22) PCT Filed: Feb. 28, 2002

(86) PCT No.: PCT/IT02/00122

§ 371 (c)(1),
(2), (4) Date: Feb. 11, 2004

(87) PCT Pub. No.: WO02/068266

PCT Pub. Date: Sep. 6, 2002

(65) Prior Publication Data

US 2004/0123917 A1 Jul. 1, 2004

(30) Foreign Application Priority Data

Feb. 28, 2001 (IT) .................... BO2001A0108

(51) Int. Cl.[7] ................................ B65B 1/04
(52) U.S. Cl. ................... 141/144; 141/83; 141/94
(58) Field of Search .................. 141/83, 129, 144, 141/94, 98; 177/50, 122

(56) References Cited

U.S. PATENT DOCUMENTS

| 4,271,505 A | | 6/1981 | Menot et al. ................. 370/85 |
| 5,148,841 A | * | 9/1992 | Graffin ......................... 141/83 |
| 5,515,888 A | * | 5/1996 | Graffin .......................... 141/1 |
| 6,644,363 B2 | * | 11/2003 | Sogliani et al. ............... 141/83 |

FOREIGN PATENT DOCUMENTS

| EP | 0 052 546 | 5/1982 |
| EP | 0 787 978 A2 | 8/1997 |
| GB | 2 017 971 A | 10/1979 |

* cited by examiner

*Primary Examiner*—Steven O. Douglas
(74) *Attorney, Agent, or Firm*—Ladas & Parry

(57) ABSTRACT

A machine (1) for filling containers (2) with liquid or particulate material (6), wherein a carousel conveyor (12), rotating continuously about an axis (9), supports a number of supporting and weighing heads (25), each independent of the other supporting and weight heads (25) and for supporting a respective container (2) beneath a respective feed device (20) for supplying the fill material (6); and wherein filling of the containers (2) is controlled by a control device (34) having a supervisor (35) connected to a number of control units (36), which are carried by the carousel conveyor (12), are connected to the supervisor (35) by a bus (38), and independently control a predetermined number of feed devices (20).

20 Claims, 2 Drawing Sheets

CONTAINER FILLING MACHINE

TECHNICAL FIELD

The present invention relates to a machine for filling containers with liquid or particulate material.

BACKGROUND ART

For this purpose, filling machines are used comprising a carousel conveyor rotating continuously about an axis; a number of feed devices for supplying the fill material, and which are carried by the conveyor, arranged about the rotation axis of the conveyor, and located at respective loading stations; and a supporting and weighing unit carried by the conveyor to support a number of empty containers, each located at a respective loading station to receive the fill material from a respective feed device.

Filling or the containers is controlled by a control device off the conveyor and of "Master-Multislave" circuit architecture, i.e. comprising a main control unit ("master") and a number of satellite control units ("slaves"), wherein the slave control units are connected to the supporting and weighing unit by sliding contacts, provide solely for acquiring electric weight signals generated by the supporting and weighing unit and indicating the weight of the containers being filled, and are controlled by the master unit, which is typically defined by a personal computer and provides for acquiring and processing the weight signals, and controlling the feed devices to cut off supply of the product to the containers when the weight of the containers reaches a preset threshold value corresponding to the amount of product with which the containers are to be filled.

Though widely used, "Master-Multislave" control architecture, in this type of application, has various drawbacks whereby not all its advantages are adequately exploited. More specifically, being responsible for overall processing of the feed device weight and control signals, the master unit, on the one hand, constitutes a fill control "bottleneck", and, on the other, limits the extent to which the output of the machine can be increased, by inevitably limiting the maximum number of feed devices installable, maximum fill speed of the container, and maximum rotation speed of the conveyor.

GB2017971 discloses a filling machine comprising a carousel conveyor rotating continuously about an axis, and a number of feed devices for supplying the fill material, and which are carried by the conveyor, arranged about the rotation axis of the conveyor, and provided with relevant electrical weighing cells. The weight of each container located in a relevant feed device is monitored by the relevant electrical weighing cell before and whilst it is being loaded with a liquid product. A preselector unit stores the weight of product required to be loaded, and a computing device is arranged to store the weight of each container, initiate loading of the product into the container and determine the instantaneous weight of product in the container and stop the loading when it determines that substantially the preset weight has been loaded. In particular, a relevant computing device is provided for each feed device; i.e. each electrical weighing cell works always with its own computing device, which comprises an analogue-digital converter circuit, a store, a substracting unit, and a comparator unit. All the computing devices are arranged in a control unit, which is locate in a fixed position over the carousel conveyor.

That is, besides providing additional loading stations and respective feed devices and/or increasing conveyor rotation and container fill speed, any increase in machine output would also mean substituting and programming a master unit of much higher processing capacity.

DISCLOSURE OF THE INVENTION

It is an object of the present invention to provide a container filling machine designed to eliminate the aforementioned drawbacks of the known state of the art.

According to the present invention, there is provided a machine for filling containers with liquid or particulate material, the machine comprising a carousel conveyor rotating continuously about an axis, a number of feed devices for supplying the material, and which are carried by the carousel conveyor, are arranged about the axis, and are located at respective loading stations, supporting and weighing means carried by the carousel conveyor to support and weigh a number of said containers, each located at a respective said loading station to receive the material from a respective said feed device, and electronic control means to control the filling of the containers and comprising a plurality of control units, each of which is connected to a number of relevant supporting and weighing means and is able to independently control a number of relevant feed devices; the machine being characterized in that the control units are carried by the carousel conveyor and in that the electronic control means comprise a supervisor for supervising the filling of the containers, which is stationary, is located outside the carousel conveyor and communicates with the control units by means of communicating means.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
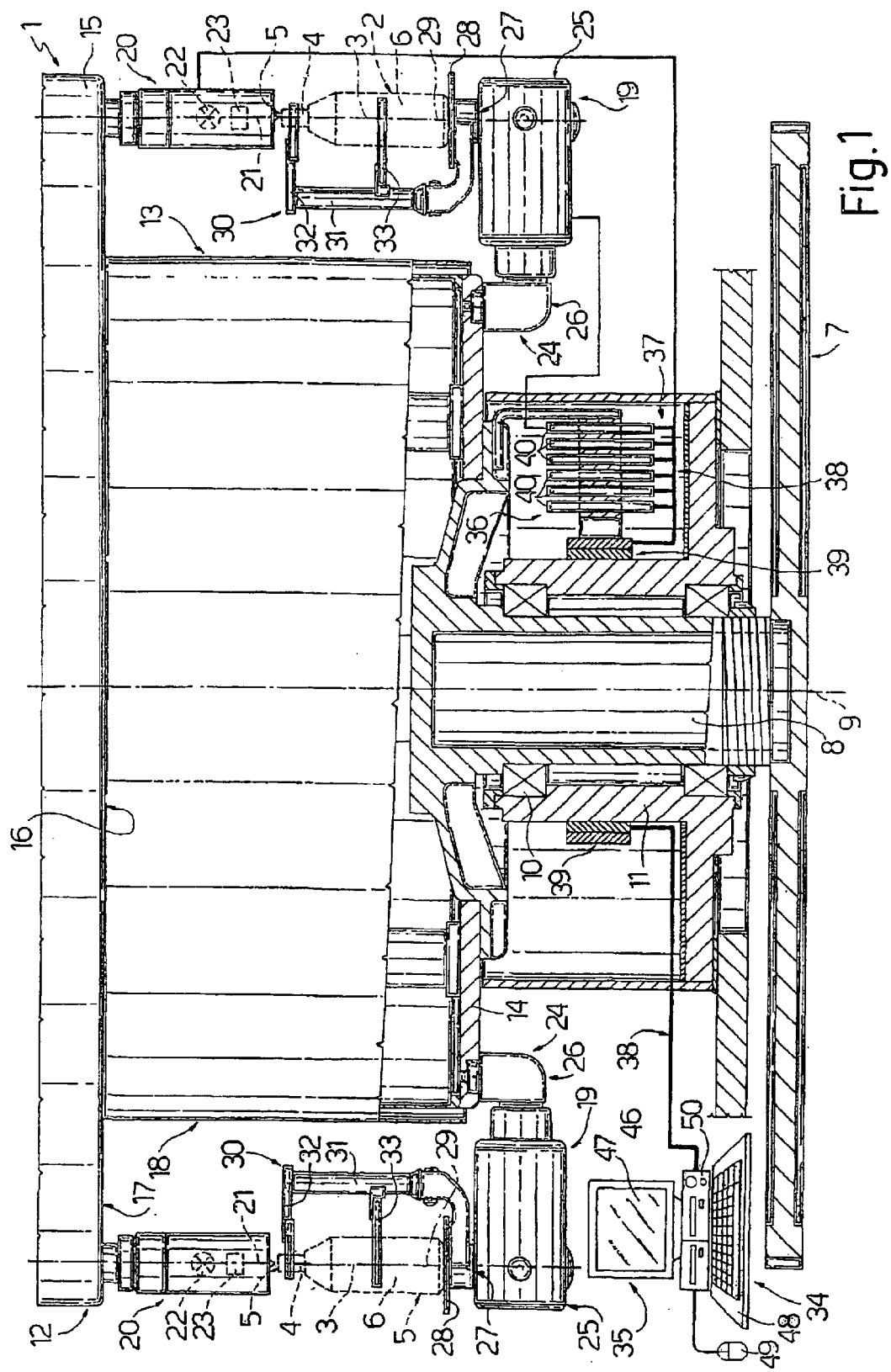
FIG. 1 shows a partly sectioned side view of a preferred embodiment of the machine according to the present invention.

With reference to the accompanying drawings, number 1 indicates as a whole a machine for filling containers, which, in the example shown, are defined by substantially cylindrical bottles 2, each positioned with its axis 3 substantially upright, and comprising, at the top, a neck 4 having, at the top end, an inlet/outlet opening 5 for a material 6, which may be particulate or, as in the example shown, liquid.

Machine 1 comprises a fixed base 7, a central portion of which is defined by a cylindrical column 8 having a substantially vertical axis 9 and supporting for rotation, with the interposition of bearings 10, a tubular base stem 11 of a carousel conveyor 12 fitted to base 7 and rotated continuously about axis 9 by a known drive motor not shown.

Conveyor 12 comprises a cylindrical base body 13 coaxial with axis 9 and defined at the bottom by a bottom wall 14 connected integrally to a top end of stem 11; and a cylindrical tank 15 also coaxial with axis 9 and supported on top of and by cylindrical body 13. Tank 15 is larger in diameter than cylindrical body 13, and is defined at the bottom by a bottom wall 16 substantially perpendicular to axis 9 and comprising a peripheral portion 17 which projects outwards of an outer cylindrical wall 18 of cylindrical body 13.

Conveyor 12 also comprises a number of loading stations 19 equally spaced about axis 9 and defined by respective known feed devices 20 for supplying material 6, and which extend downwards from peripheral portion 17 of wall 16 of tank 15 along respective axes 21 parallel to axis 9, and are controlled in known manner by respective valve devices 22 and by respective known flow sensors 23 shown schematically; and a supporting unit 24 for receiving bottles 2 and supporting each at a respective loading station 19, outwards of wall 18, beneath peripheral portion 17 of wall 16, and with respective axis 3 coaxial with axis 21 of a relative feed device 20.

Supporting unit 24 comprises, for each loading station 19, a respective supporting and weighing head 25 connected removably to cylindrical body 13 with the interposition of a fast-fit structural and functional connecting/disconnecting device or bracket 26 integral with cylindrical body 13.

Each supporting and weighing head 25 comprises a scale 27 having a plate 28, which has an axis 29 substantially parallel to axis 9, and which is connected integrally to a gripping assembly 30 for holding a relative bottle 2 erect on plate 28, with its axis 3 coaxial with axis 29, and comprising an upright 31 extending upwards from and alongside plate 28, and supporting a top and bottom fork 32, 33 for engaging the neck 4 and body of bottle 2 respectively.

Figure 2:
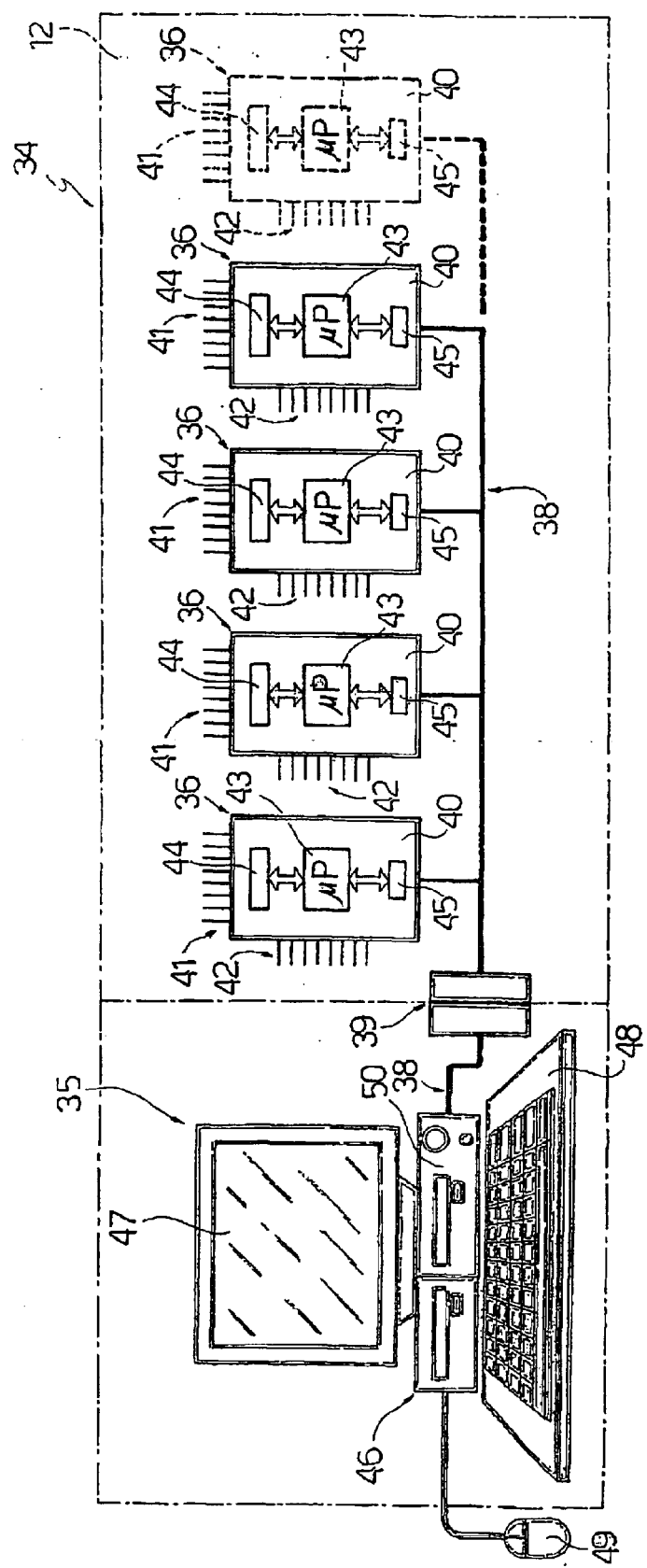
FIG. 2 shows a block diagram of a control device forming part of the FIG. 1 machine.

With reference also to FIG. 2, machine 1 also comprises a control device 34 for controlling the filling of bottles 2, and of "Multi-Master", i.e. distributed, circuit architecture, wherein a supervisor 35, for monitoring overall operation of machine 1 and the filling of bottles 2, is connected to and communicates with a number of control units 36, each for independently controlling a predetermined number of, e.g. eight or twelve, feed devices 20.

More specifically, control units 36 are carried by, and housed in a compartment 37 on, conveyor 12, while supervisor 35 is stationary, is located outside conveyor 12, and communicates with control units 36 by means of a dedicated bus 38 and sliding contacts 39.

Each control unit 36 is substantially defined by a printed-circuit-type weighing and control board 40 having a number of inputs 41—one for each feed device 20 controlled by weighing and control board 40—and a number of outputs 42—one for each feed device 20 controlled by weighing and control board 40. More specifically, each input 41 of weighing and control board 40 is connected to a respective scale 27, from which it receives an electric weight signal indicating the weight of bottle 2 on scale 27; and each output 42 of weighing and control board 40 is connected to valve device 22 of a respective feed device 20, and supplies feed device 20 with an electric control signal for regulating the amount of product supplied by feed device 20.

Each weighing and control board 40 substantially comprises a microprocessor 43, which is connected by bus 38 to microprocessors 43 of the other weighing and control boards 40 and to supervisor 35, and has a memory 44 (shown separately for illustration reasons) storing "firmware" for controlling the filling of bottles 2, which is performed as described in detail later on.

More specifically, control units 36 may conveniently be connected to supervisor 35 as per IEC standard 61131, i.e. using a CANopen-protocol CANbus line, and balanced RS-422 input/output ports indicated schematically by 45 in FIG. 2; and sliding contacts 39 may conveniently be mercury-bath bearing types.

Supervisor 35 substantially comprises a personal computer 46 having a display unit 47, a keyboard 48, a mouse 49, and a processing unit 50, an input/output port (not shown) of which is connected by bus 38 to all the microprocessors 43 of weighing and control boards 40.

In actual use, before commencing a new fill process of bottles 2, the machine 1 operator, using keyboard 48 and/or mouse 49, loads supervisor 35 with fill process setting data, such as bottle type, product quantity per bottle, product type (liquid, particulate), bottle fill speed, etc.

Once loaded, supervisor 35 supplies the fill process setting data to microprocessors 43 of weighing and control boards 40, which store the data in memories 44, and then starts the fill process, wherein conveyor 12 is rotated continuously about axis 9, and, at each turn, each loading station 19 receives a relative bottle 2 which is unloaded when filled.

With reference to one loading station 19, once an empty bottle 2 is loaded on to plate 28 of relative head 25 and engaged by relative gripping assembly 30, scale 27 supplies an electric signal indicating the weight of bottle 2, which is acquired by microprocessor 43 of the weighing and control board 40 controlling filling at that particular loading station 19.

On the basis of the weight signal generated by scale 27, microprocessor 43 determines, in known manner not described in detail, the weight (tare) of the empty bottle 2. Once this is done, microprocessor 43, on the basis of the setting data received from supervisor 35 at the start of the fill process of bottles 2, opens valve device 22 of relative feed device 20 to gradually fill bottle 2, the gradual increase in weight of which is detected continuously by relative scale 27.

Microprocessor 43 constantly monitors flow of material 6 and the weight of bottle 2 being filled, and shuts valve device 22 when the detected weight, minus the tare measured previously, corresponds with the product quantity per bottle data supplied, as stated, to microprocessor 43 by supervisor 35 at the start of the fill process of bottles 2.

Obviously, bottle 2 is filled before reaching a station (not shown) where it is unloaded in known manner off relative plate 28.

In the event the flow of material 6 through relative feed device 20 and detected by relative flow sensor 23 is not accompanied by a continuous increase in weight of bottle 2, microprocessor 43 determines a broken-bottle condition and immediately closes valve device 22 and supplies supervisor 35 with a broken-bottle alarm signal.

In the course of the fill process, each microprocessor 43 supplies supervisor 35 with data relative to the filling operations at the loading stations 19 under its control, and supervisor 35, by means of an appropriate graphic interface, displays the data on display unit 47 to provide the machine 1 operator with real-time updated information concerning the filling of bottles 2 at each loading station 19.

In the course of the fill process, each microprocessor 43 also communicates with microprocessors 43 of the other weighing and control boards 40, with which it exchanges data relative to any dynamic variations in fill process parameters, such as the presence and magnitude of any thermal changes, any changes in the parameters (density) of the liquid fed into bottles 2, etc., so that each microprocessor 43 can take these into account in controlling the filling of relative bottles 2.

In the course of the fill process, both microprocessors 43 and supervisor 35—the former on the basis of the weight signals, and the latter on the basis of data received from microprocessors 43—perform diagnostic operations to determine any irregularity in the fill process of bottles 2 and so immediately correct operation of feed devices 20 and machine 1.

In connection with machine 1 as described above, it should be pointed out that dividing and distributing control of the filling of bottles 2 using "Multi-Master" circuit architecture provides for increasing as required, not only the number of loading stations 19, but also the rotation speed of conveyor 12 and the fill speed of bottles 2, thus greatly increasing the output of machine 1.

Moreover, distributing control of the filling of bottles 2 provides for obtaining a modular control device 34, wherein, weighing and control boards 40 all being identical, the number of loading stations 19 can be increased by simply providing additional weighing and control boards 40.

Moreover, by only controlling filling at a small number of loading stations 19, each weighing and control board 40 is relatively straightforward in terms of circuitry and relatively cheap.

Moreover, the wiring connecting weighing and control boards 40 to supervisor 35 is relatively straightforward and compact, thus greatly simplifying repair work as compared with currently used filling machines in which the slave units are all housed in a so-called "electric cabinet" in respective terminal boards connected to the master unit normally located close to the electric cabinet, so that the wiring in the electric cabinet is normally packed in a confined space and awkward to work on.

What is claimed is:

1. A machine for filling containers with liquid or particulate material, the machine (1) comprising a carousel conveyor (12) rotating continuously about an axis (9), a number of feed devices (20) for supplying the material (6), and which are carried by the carousel conveyor (12), are arranged about the axis (9), and are located at respective loading stations (19), supporting and weighing means (24) carried by the carousel conveyor (12) to support and weigh a number of said containers (2), each located at a respective said loading station (19) to receive the material (6) from a respective said feed device (20), and electronic control means (34) to control the filling of the containers (2) and comprising a plurality of control units (36), each of which is connected to a number of relevant supporting and weighing means (24) and is able to independently control a number of relevant feed devices (20); the machine being characterized in that the control units (36) are carried by the carousel conveyor (12) and in that the electronic control means (34) comprise a supervisor (35) for supervising the filling of the containers (2), which is stationary, is located outside the carousel conveyor (12) and communicates with the control units (36) by means of communicating means (38, 39).

2. A machine as claimed in claim 1, wherein the supporting and weighing means (24) comprise a number of scales (27), each for supporting and weighing a respective container (2) at a respective loading station (19), and for generating an electric weight signal indicating the weight of the relative container (2); each of the control units (36) having a number of inputs (41), each connected to a respective scale (27) to receive the relative weight signal, and a number of outputs (42), each connected to a respective feed device (20) to supply an electric control signal for regulating the amount of product supplied by the feed device (20).

3. A machine as claimed in claim 1, wherein each control unit (36) comprises a printed-circuit-type weighing and control board (40) including a microprocessor (43) connected to the supervisor (35) to exchange setting data and data relative to the fill process of the relative containers (2); the microprocessor (43) also receiving the weight signals generated by the relative scales (27), and generating control signals for controlling the relative feed devices (20).

4. A machine as claimed in claim 3, wherein each microprocessor (43) is connected to the microprocessors (43) of the other weighing and control boards (40) to exchange data relative to the fill process of the relative containers (2).

5. A machine as claimed in claim 1, wherein the communicating means (38, 39) comprises a bus connection (38) for connecting the control units (36) to the supervisor (35).

6. A machine as claimed in claim 5, wherein the control units (36) are also connected to one another by the bus connection (38).

7. A machine as claimed in claim 5, wherein the bus connection (38) is a CANbus operating with a CANopen protocol.

8. A machine as claimed in claim 1, wherein the communicating means (38, 39) comprises sliding contacts (39) for connecting the control units (36) to the supervisor (35).

9. A machine as claimed in claim 8, wherein said sliding contacts (39) are mercury-bath bearing types.

10. A machine as claimed in claim 2, wherein each control unit (36) comprises a printed-circuit-type weighing and control board (40) including a microprocessor (43) connected to the supervisor (35) to exchange setting data and data relative to the fill process of the relative containers (2); the microprocessor (43) also receiving the weight signals generated by the relative scales (27), and generating control signals for controlling the relative feed devices (20).

11. A machine as claimed in claim 2, wherein the communicating means (38, 39) comprises a bus connection (38) for connecting the control units (36) to the supervisor (35).

12. A machine as claimed in claim 3, wherein the communicating means (38, 39) comprises a bus connection (38) for connecting the control units (36) to the supervisor (35).

13. A machine as claimed in claim 4, wherein the communicating means (38, 39) comprises a bus connection (38) for connecting the control units (36) to the supervisor (35).

14. A machine as claimed in claim 6, wherein the bus connection (38) is a CANbus operating with a CANopen protocol.

15. A machine as claimed in claim 2, wherein the communicating means (38, 39) comprises sliding contacts (39) for connecting the control units (36) to the supervisor (35).

16. A machine as claimed in claim 3, wherein the communicating means (38, 39) comprises sliding contacts (39) for connecting the control units (36) to the supervisor (35).

17. A machine as claimed in claim 4, wherein the communicating means (38, 39) comprises sliding contacts (39) for connecting the control units (36) to the supervisor (35).

18. A machine as claimed in claim 5, wherein the communicating means (38, 39) comprises sliding contacts (39) for connecting the control units (36) to the supervisor (35).

19. A machine as claimed in claim 6, wherein the communicating means (38, 39) comprises sliding contacts (39) for connecting the control units (36) to the supervisor (35).

20. A machine as claimed in claim 7, wherein the communicating means (38, 39) comprises sliding contacts (39) for connecting the control units (36) to the supervisor (35).

* * * * *